US012664459B2

(12) United States Patent
Yoo et al.

(10) Patent No.: US 12,664,459 B2
(45) Date of Patent: Jun. 23, 2026

(54) QUANTUM WRAPPER NETWORKING

(71) Applicant: The Regents of the University of California, Oakland, CA (US)

(72) Inventors: Sung-Joo Ben Yoo, Davis, CA (US); Prem Kumar, Skokie, IL (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 566 days.

(21) Appl. No.: 18/248,931

(22) PCT Filed: Oct. 29, 2021

(86) PCT No.: PCT/US2021/057342
§ 371 (c)(1),
(2) Date: Apr. 13, 2023

(87) PCT Pub. No.: WO2022/094268
PCT Pub. Date: May 5, 2022

(65) Prior Publication Data
US 2023/0385683 A1      Nov. 30, 2023

Related U.S. Application Data

(60) Provisional application No. 63/256,329, filed on Oct. 15, 2021, provisional application No. 63/148,042, (Continued)

(51) Int. Cl.
*G06N 10/80*        (2022.01)
*G06N 10/20*        (2022.01)

(52) U.S. Cl.
CPC ............. *G06N 10/80* (2022.01); *G06N 10/20* (2022.01)

(58) Field of Classification Search
CPC .............................. G06N 10/20; G06N 10/80
See application file for complete search history.

(56) References Cited

U.S. PATENT DOCUMENTS

| | | | | |
|---|---|---|---|---|
| 2003/0142386 A1* | 7/2003 | Beil | .......................... | G02F 3/00 |
| | | | | 359/326 |
| 2004/0078421 A1* | 4/2004 | Routt | ..................... | G06N 10/20 |
| | | | | 709/201 |

(Continued)

FOREIGN PATENT DOCUMENTS

| | | |
|---|---|---|
| CN | 102255942 A | 11/2011 |

OTHER PUBLICATIONS

Nicholas Christopher Harris, "Programmable Nanophotonics for Quantum Information Processing and Artificial Intelligence", Sep. 2017.

(Continued)

*Primary Examiner* — Christopher E Dunay
(74) *Attorney, Agent, or Firm* — MARSHALL, GERSTEIN & BORUN LLP

(57) ABSTRACT

One embodiment provides a system and method for transporting quantum datagrams over a network. During operation, a quantum datagram is obtained at a network node. The quantum datagram can include a wrapper and an optical quantum data payload, with the wrapper comprising classical non-quantum optical bits and the quantum data payload comprising quantum bits (qubits). The system separates the wrapper from the quantum data payload such that the classical bits included in the wrapper are processed while the qubits included in the quantum data payload remain undisturbed, and makes a forwarding decision for the quantum datagram based on the processed wrapper.

27 Claims, 15 Drawing Sheets

Related U.S. Application Data filed on Feb. 10, 2021, provisional application No. 63/147,610, filed on Feb. 9, 2021, provisional application No. 63/108,178, filed on Oct. 30, 2020.

(56) References Cited

U.S. PATENT DOCUMENTS

| | | | | | |
|---|---|---|---|---|---|
| 2004/0238813 | A1* | 12/2004 | Lidar | .................... | G06N 10/20 |
| | | | | | 257/31 |
| 2008/0137858 | A1* | 6/2008 | Gelfond | ................. | H04B 10/70 |
| | | | | | 380/256 |
| 2012/0177201 | A1* | 7/2012 | Ayling | ................. | H04L 9/0858 |
| | | | | | 380/278 |
| 2016/0218867 | A1* | 7/2016 | Nordholt | ............... | H04L 9/0852 |
| 2022/0382605 | A1* | 12/2022 | Griffin | .................... | G06F 9/546 |

OTHER PUBLICATIONS

S.J. Ben Yoo et al., "Quantum Wrapper Networking", IEEE, Conference Oct. 18-21, 2021.
T. Chaneliere, "Storage and retrieval of single photons transmitted between remote quantum memories", Dec. 8, 2005.

\* cited by examiner

QUANTUM WRAPPER NETWORKING

CROSS-REFERENCE TO RELATED APPLICATIONS

This application claims priority under 35 U.S.C. § 119(e) to U.S. Provisional Application Ser. No. 63/108,178, entitled "Quantum Wrapper Networking," by inventors Sung-Joo Ben Yoo and Prem Kumar, filed on 30 Oct. 2020; U.S. Provisional Application Ser. No. 63/147,610, entitled "Quantum Wrapper Networking," by inventor Sung-Joo Ben Yoo, filed on 9 Feb. 2021; U.S. Provisional Application Ser. No. 63/148,042, entitled "Quantum Wrapper Switch Router with Repeaters and Switches," by inventor Sung-Joo Ben Yoo, filed on 10 Feb. 2021; Provisional Application Ser. No. 63/256,329, entitled "Quantum Wrapper Networking," by inventor Sung-Joo Ben Yoo, filed on 15 Oct. 2021, the contents of which are hereby incorporated herein by reference.

GOVERNMENT LICENSE RIGHTS

This invention was made with U.S. government support under grant number 1611560 awarded by the National Science Foundation. The U.S. government has certain rights in the invention.

BACKGROUND

Field

The disclosed embodiments generally relate to quantum networking technologies. More specifically, the disclosed embodiments relate to a quantum communication network that uses classical bits as packet labels for quantum data payloads.

Related Art

The realization and deployment of a large-scale quantum network will truly revolutionize the way we conduct our lives. For instance, while the Internet has become a necessity for everyone, everywhere, and at every time, we constantly worry about identity theft and security breaches. The prospect of the quantum Internet based on quantum entanglement between any two points on Earth's surface opens the possibility of secure communication of our data, including our health conditions and financial information.

However, the quantum Internet is far from a reality. A quantum network transmits quantum bits (qubits), which are fundamentally different from classical bits. Unlike classical bits, qubits cannot be copied or amplified, or they may be entangled with other qubits, making transmitting qubits over long distances a challenge. Moreover, qubits can be fragile and their fundamental principles make it difficult, if not impossible, for measurements or monitoring, which is often needed for network control and management. There are currently no readily available network control, management, and operation protocols for quantum networks. Furthermore, instead of overhauling today's classical networks and installing new quantum networks overnight, it is more desirable to have a strategy for seamlessly upgrading existing networks to the new quantum networks while providing interoperability.

SUMMARY

One embodiment provides a system and method for transporting quantum datagrams over a network. During operation, a quantum datagram is obtained at a network node. The quantum datagram can include a wrapper and an optical quantum data payload, with the wrapper comprising classical non-quantum optical bits and the quantum data payload comprising quantum bits (qubits). The system separates the wrapper from the quantum data payload such that the classical bits included in the wrapper are processed while the qubits included in the quantum data payload remain undisturbed, and makes a forwarding decision for the quantum datagram based on the processed wrapper.

In a variation on this embodiment, the wrapper can include a header, and the quantum data payload is positioned, in time, after the header.

In a further variation, the wrapper can further include a tail, and the quantum data payload is positioned, in time, between the header and the tail.

In a variation on this embodiment, the wrapper can include one or more of: an identifier of a circuit for circuit-switching of the quantum datagram, a label for label-switching of the quantum datagram, and destination and source addresses for the quantum datagram.

In a variation of this embodiment, the qubits in the quantum datagram can be entangled with qubits in other quantum datagrams.

In a variation on this embodiment, the wrapper can indicate one or more of: length of the quantum data payload, priority of the quantum data payload, quality of service (QoS) of the quantum data payload, type of service (ToS) of the quantum data payload, entanglement information associated with the quantum data payload and quantum data payloads in other quantum datagrams, and additional bits for error estimation.

In a variation on this embodiment, the qubits can include one or more of: time-bin encoded photons, frequency-bin encoded photons, and polarization-encoded photons.

In a variation on this embodiment, separating the wrapper from the quantum data payload can include sending the quantum data payload to a first switch, and subsequent to processing the wrapper, the system combines the wrapper with the quantum data payload using a second switch.

In a variation on this embodiment, the system generates a new wrapper and attaches the new wrapper to the quantum data payload prior to forwarding the quantum datagram.

In a variation on this embodiment, subsequent to separating the wrapper from the quantum data payload, the system sends the quantum data payload to a signal enhancing system for improving signal quality of the quantum data payload. The signal enhancing system can include one or more of: a quantum repeater and a quantum memory.

In a variation on this embodiment, the system monitors signal quality of the wrapper, statistically estimates signal quality of the quantum data payload based on the signal quality of the wrapper, and applies corrective transformations to restore the signal quality of the quantum data payload without measuring the qubits.

In a further variation, monitoring the signal quality of the wrapper comprises one or more of: performing a bit-error-rate (BER) measurement, performing an optical signal-to-noise ratio (OSNR) measurement, performing an optical spectrum measurement, performing a polarization dependent loss (PDL) measurement, performing a polarization mode dispersion (PMD) measurement, performing a time jitter measurement, and performing a checksum test.

In a variation on this embodiment, the system can implement a software defined networking (SDN) protocol to achieve network control and management.

In a variation on this embodiment, the network co-exists with one or more classical networks comprising: an Ethernet network, a multiprotocol label switching (MPLS) network, an optical transport network (OTN), an asynchronous transfer mode (ATM) network, and an Internet protocol (IP) network.

One embodiment provides a system for transporting quantum datagrams over a network. The system can include an ingress switch to separate a wrapper from a quantum data payload included in a received quantum datagram, with the wrapper comprising classical non-quantum optical bits and the quantum data payload comprising quantum bits (qubits). The system can further include a wrapper-processor to process the classical bits included in the wrapper, an optical delay line to propagate the quantum data payload while the classical bits included in the wrapper are processed, and a controller to make a forwarding decision for the quantum datagram based on the processed wrapper.

BRIEF DESCRIPTION OF THE FIGURES

In the figures, like reference numerals refer to the same figure elements.

DETAILED DESCRIPTION

Figure 1:
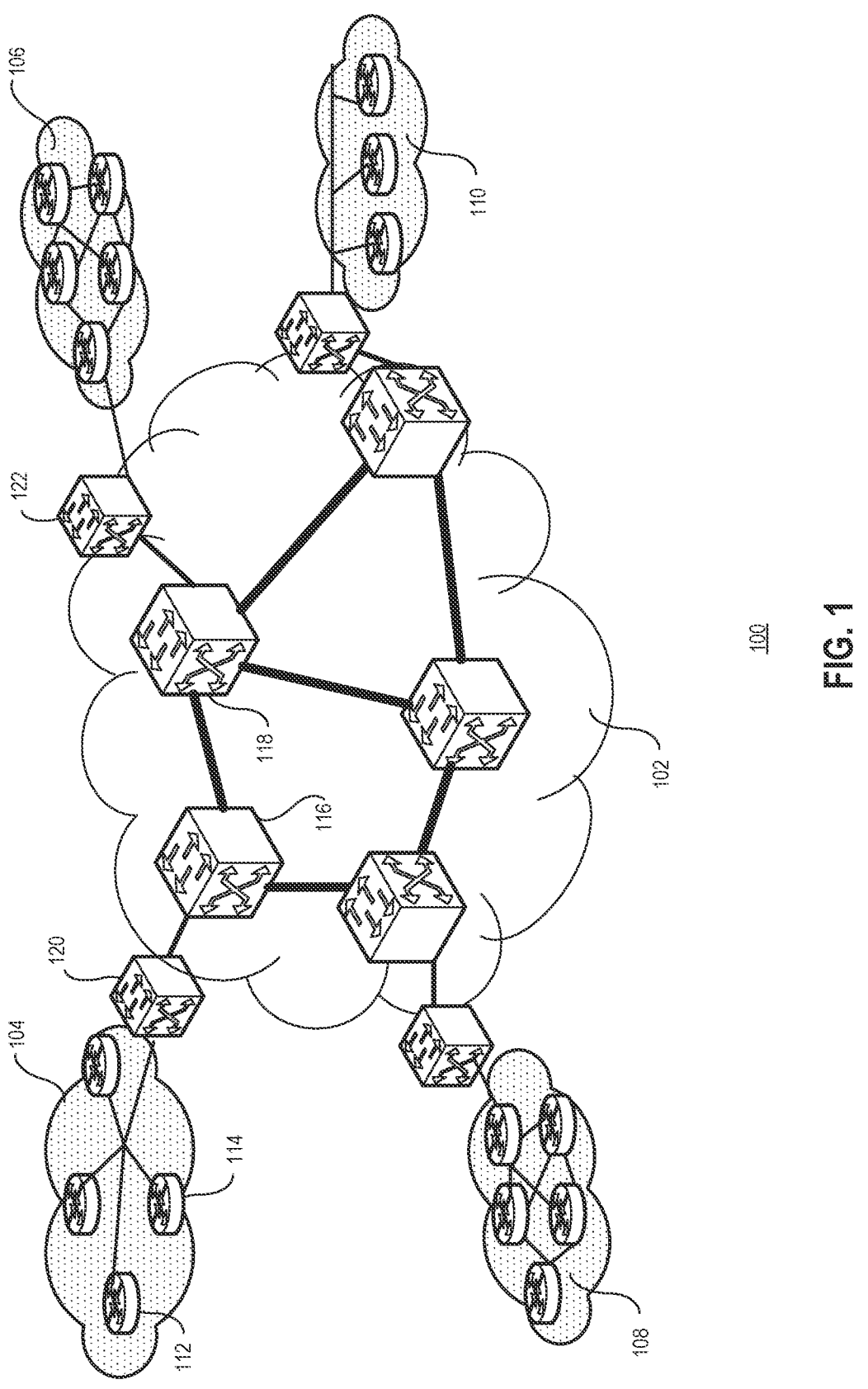
FIG. 1 illustrates exemplary architecture of a Quantum Wrapper (QW) network, according to one embodiment of the present application.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments provide a method and system for implementing a Quantum Wrapper Networking (QWN) protocol to enable control, management, and operation of quantum networks. The QWN protocol can interoperate with existing Optical Transport Network (OTN) protocol, thus enabling the co-existence of quantum networks and classical networks. More specifically, a quantum data payload comprising qubits can be wrapped by a quantum wrapper (QW) comprising classical bits. The QW can include a QW header as well as an optional QW tail. The QW can include information pertaining to routing, multiplexing, entanglement, quantum error correction, etc., of the quantum data payload to facilitate end-to-end transport of the quantum data payload without reading or affecting the qubits in the quantum data payload. The QW header and tail can have predetermined bit formats and data rate, whereas the quantum payload can have an arbitrary qubit format and data rate. The QW allows quantum payloads to be transported and switched in a way similar to the transporting and switching of data payloads in an Optical-Label-Switching (OLS) network. During operation, QW switch routers read the QW and forward the quantum payload with or without QW swapping. An out-of-band data communication channel (DCC) can communicate with the network control and management (NC&M) system to achieve end-to-end routing and transport by updating the forwarding table of the QW switch routers. This process is compatible with Software Defined Networking (SDN) currently popular amongst telecommunication and computer networking industries. Although direct performance monitoring of the quantum payload can be difficult or impossible to achieve, the signal quality of the quantum payload can be inferred by monitoring the health of the classical bits included in the QW.

QWN Architecture

FIG. 1 illustrates exemplary architecture of a Quantum Wrapper (QW) network, according to one embodiment of the present application. QW network 100 can include a quantum core network 102 and a number of quantum local area networks (QLANs), such as QLANs 104, 106, 108, and 110. Each QLAN can include a number of client nodes (e.g., client nodes 112 and 114 in QLAN 104). Quantum core network 102 can include a number of QW core switch routers (e.g., QW core switch routers 116 and 118) and a number of QW edge switch routers (e.g., QW edge switch routers 120 and 122) coupling the QLANs to quantum core network 102.

Quantum core network 102 and the QLANs have various network topologies, including but not limited to: mesh, star, ring, etc. The scope of this disclosure is not limited by the topology of the core and edge networks. A client node (e.g., client node 112 or 114) in the QLANs can have quantum computing capabilities and can generate and read a quantum data payload comprising qubits. Because QW network 100 is built upon an optical network, the qubits are quantum-encoded photons. The quantum data payload can assume any qubit format (e.g., polarization encoding, time-bin encoding, frequency-bin encoding, etc.) and protocol (e.g., discrete variable (DV) or continuous variable (CV)). In some embodiments, a QLAN can include a quantum computing cluster or a sensor cluster. Because the qubits themselves cannot be read or switched (which could destroy the qubits and the information they carry) before they arrive at their destination, the quantum data payload is wrapped by a quantum wrapper that includes a QW header and a QW tail. More specifically, in the time domain, the qubits can be placed between the QW header and the QW tail separated by a guard time. The edge switch routers (e.g., edge switch routers 120 and 122) can interface with the QLANs to place an appropriate wrapper around each quantum data payload. On the other hand, the core switch routers (e.g., QW core switch routers 116 and 118) read and process the quantum wrappers to make routing decisions based on the quantum wrapper without disturbing the qubits in the quantum data payload. For example, the core switch routers can forward the quantum datagrams, establish data flows, and set up/tear down circuits using the QW headers and an additional data communication channel (DCC) that supports communications in the control plane and management plane. For example, the quantum datagrams can be on wavelength-division multiplexing (WDM) data channels, whereas the DCC can be on a separate wavelength channel.

Because the quantum wrappers (QWs) only include classical bits, the way the QWs are read and processed can be similar to that of the optical labels in an OLS network. Like the optical labels, the QWs wrapping around quantum data payloads can be swapped at routers to facilitate the forwarding of the quantum data payloads. Various routing/switching techniques can be used to route/switch the quantum datagram (which comprises the classical bits of the QW and the qubits of the data payload), including but not limited to: circuit switching, label switching, optical packet switching, etc. The QWs can be treated as labels or packet headers, making this solution interoperable with existing telecom protocols, such as Ethernet, OTN, multiprotocol label switching (MPLS), asynchronous transfer mode (ATM), Internet protocol (IP), etc.

Figure 2:
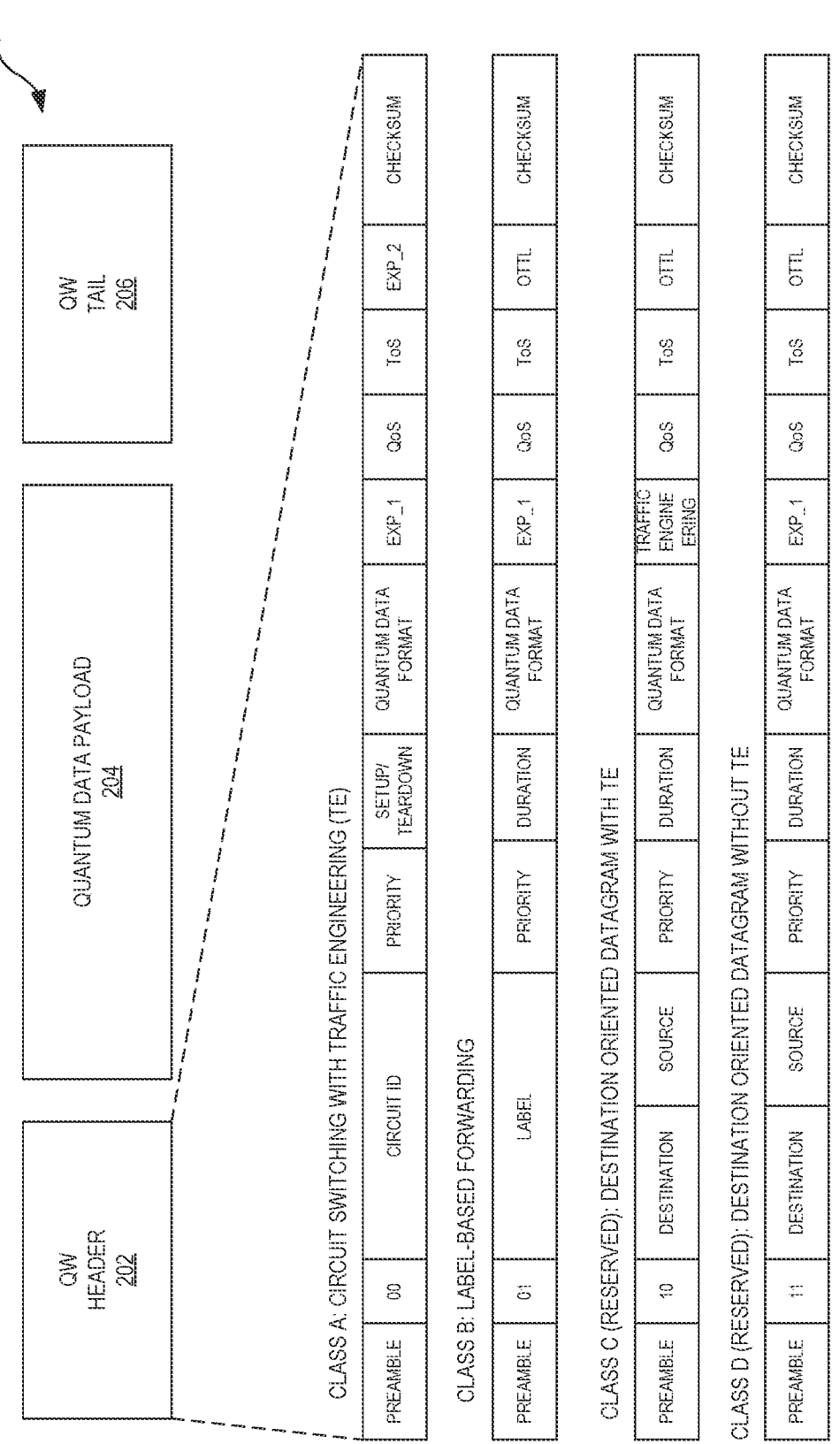
FIG. 2 illustrates an exemplary QW datagram, according to one embodiment.

FIG. 2 illustrates an exemplary QW datagram, according to one embodiment. QW datagram 200 includes a QW header 202, a quantum data payload 204, and a QW tail 206. Note that QW header 202, quantum data payload 204, and QW tail 206 are sequential in time, with a guard time between QW header 202 and quantum data payload 204 and an additional guard time between quantum data payload 204 and QW tail 206. As discussed previously, QW header 202 and QW tail 206 are made of classical bits, meaning that they are encoded using classical signals (which can be optical or electrical signals) and they can be read, copied, amplified, or otherwise processed using any classical mechanism. In some embodiments, to increase throughput, the QW datagrams can be multiplexed in the wavelength domain. Accordingly, QW header 202 and QW tail 206 can include WDM signals.

In general, QW header 202 can include information pertaining to the type/length of quantum data payload 204, the source/destination of quantum data payload 204, the required type/quality/class of the service (ToS/QoS/CoS), the format/protocol/rate of quantum data payload 204, the traffic engineering (TE) requirements, etc. In addition to carrying information related to quantum data payload 204, which is in the same quantum datagram as QW header 202, QW header 202 also needs to carry information related to quantum data payloads of other quantum datagrams dictated by the nature of quantum data payload 204, such as its entanglement with quantum data payloads in other quantum datagrams. The format of QW header 202 can be determined based on a certain protocol (e.g., the QW Networking protocol) defined and agreed to by the network. FIG. 2 also shows exemplary bit formats of QW header 202 for different functional classes of QW. In some embodiments, there can be four functional classes of QWs, including Class A for circuit switch with TE, Class B for label-based forwarding, and Class C and Class D that are reserved for optical packet switching using the destination-source labels with TE (Class C) or Experimental methods (Class D). The four functional classes of the QW are similar to the four classes of IP headers. In alternative embodiments, QW headers can be made similar to frame structures defined by Ethernet or OTN protocols.

In the examples shown in FIG. 2, the Class A QW header can include a circuit ID field, a priority field, a setup/teardown field, a quantum-data-format field, experimental fields (Exp_1, Exp_2), a quality of service (QoS) field, a type of service (ToS) field, and a checksum field that include additional bits for classical error estimation. The number of checksum bits should be sufficient (e.g., 128 bits) to trigger errors easily. The Class B QW header can be similar to the Class A QW header, except that the circuit ID field is replaced with a label field, the set/teardown field is replaced with a duration field (which corresponds to the length of the quantum data payload), and one of the experimental fields is replaced with an optical-time-to-live (OTTL) field. The Class C QW header and the Class D QW header are also similar, with the circuit ID/label field being replaced with destination and source fields. The OTTL field can incorporate a time-stamp or the number of allowed hop-count information to allow expiration of the QW datagram depending on the amount of time or the number of hops.

Quantum data payload 204 can include a plurality of qubits having an arbitrary format (e.g., polarization encoding, time-bin encoding, frequency-bin encoding, etc.) and data rate. In some embodiments, quantum data payload 204 can include entangled qubits to be distributed to pairs of quantum nodes on the network for the purpose of quantum teleportation between the node pairs.

QW tail 206 can provide a clear indication of the ending of the datagram. It can be optional, because the network elements expect to have accurate clocks, but it can be useful in long datagrams or circuit-switched networks where the setup and teardown of the circuit rely on information included in the QW. Moreover, QW tail 206 can be used for monitoring the quality of the transmission channel. For example, for polarization-encoded qubits, the correlation between the polarization transfer function of QW header 202 and QW tail 206 can be used to verify that the channel was static during transmission. If QW header 202 and QW tail 206 have significantly different polarization transformations (indicating that the polarization is not stable), then measurements on quantum data payload 204 can be dropped. In some case, when the polarization changes between QW header 202 and QW tail 206 are discernable and can provide information on the polarization dynamics in the channel the quantum datagram has traversed, corrective polarization transformations can be used to restore the quality of the quantum data payload without making any measurements on the qubits. In some embodiments, the number of bits and the data rate of QW header 202 and QW tail 206 can be predetermined, although the length and data rate of quantum data payload 204 can be arbitrary.

Point-to-Point Transport

Figure 3A:
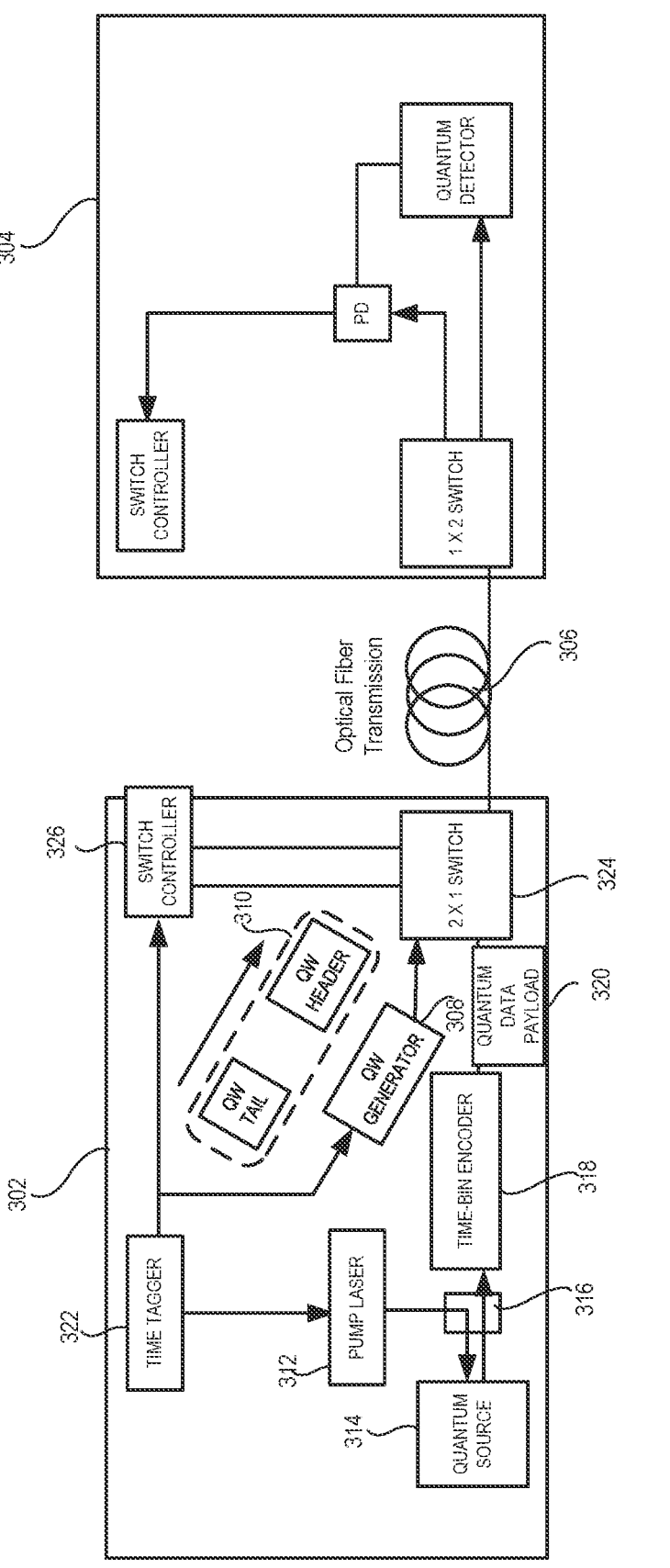
FIGS. 3A-3C illustrate exemplary point-to-point transport of quantum data payload using QW, according to one embodiment.
Figure 3B:
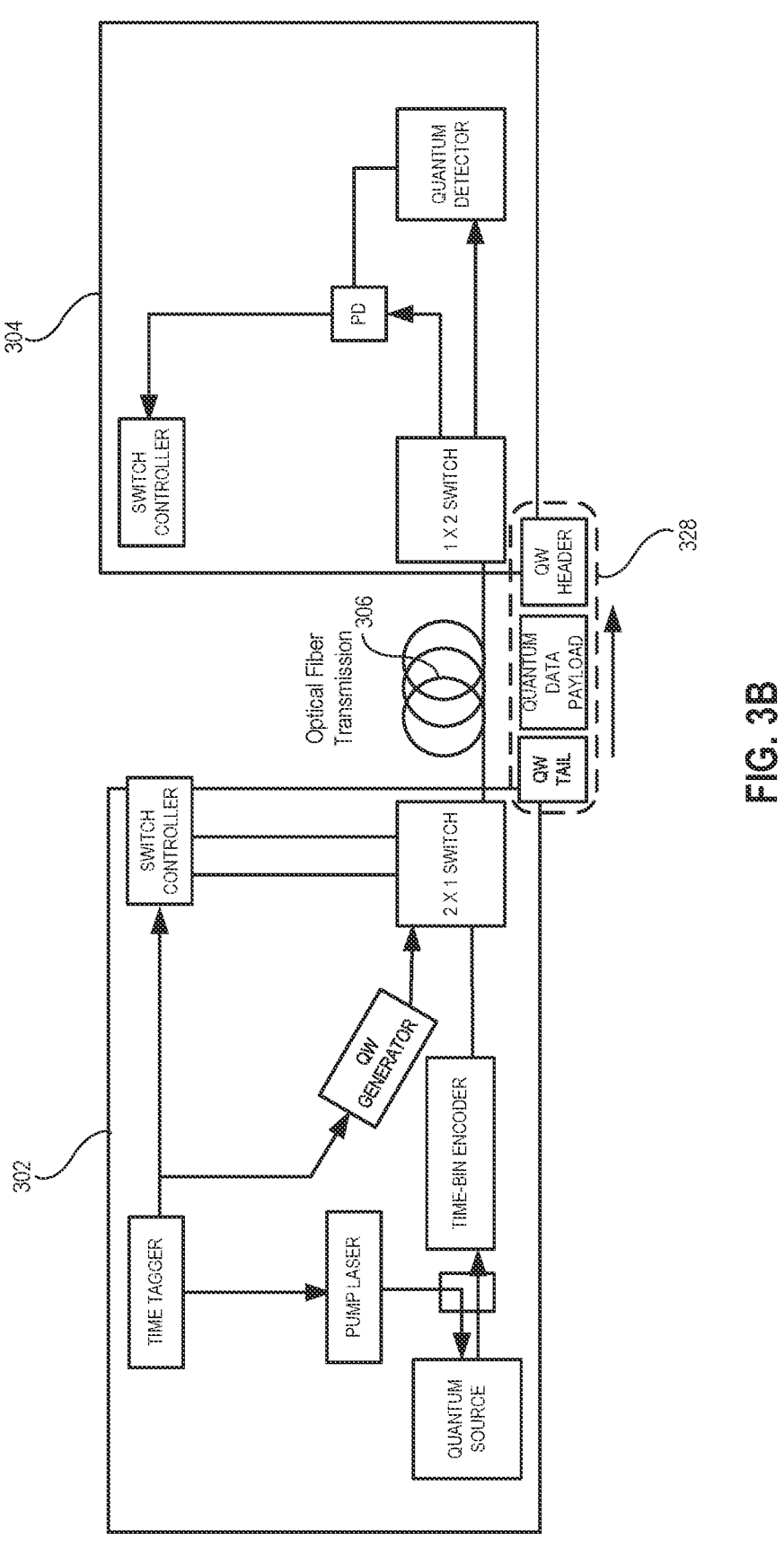
Figure 3C:
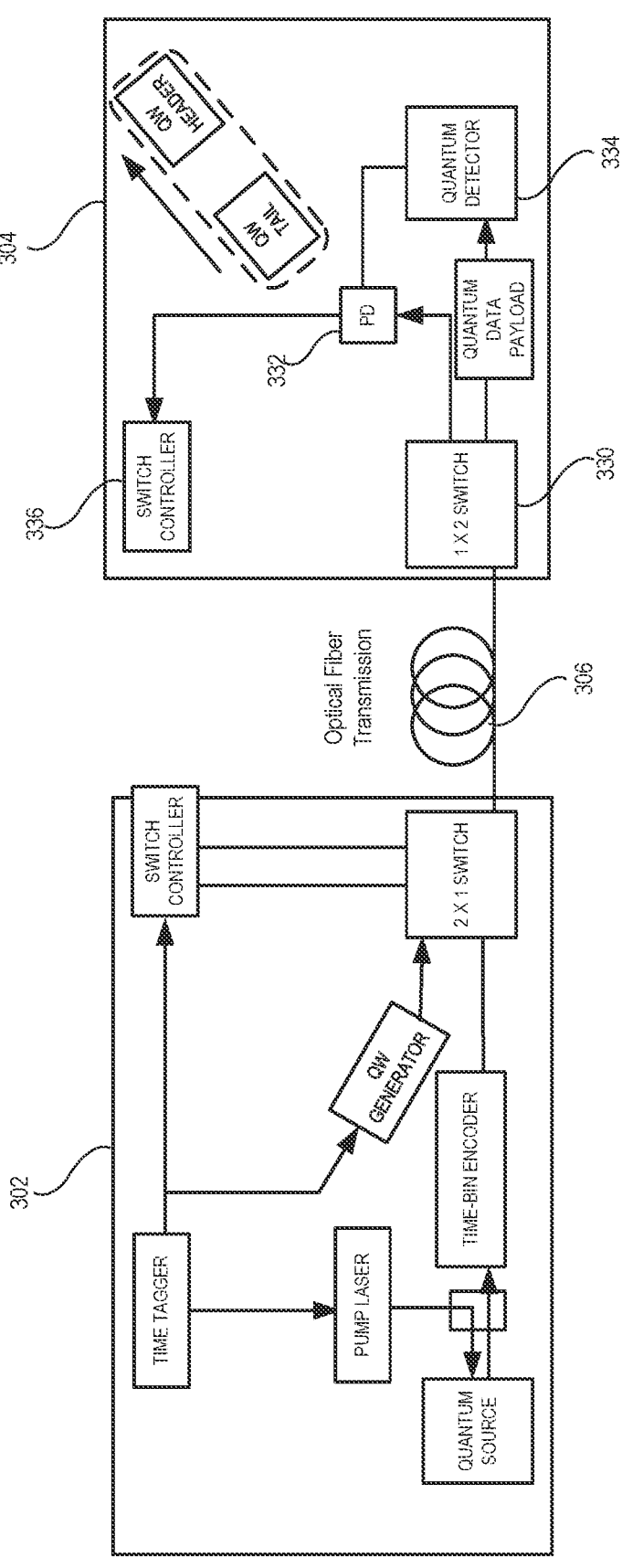

FIGS. 3A-3C illustrate exemplary point-to-point transport of a quantum data payload using QW, according to one embodiment. In FIG. 3A, network nodes 302 and 304 are coupled to each other by an optical fiber 306. More specifically, FIG. 3A shows that node 302 generates a quantum datagram by attaching a QW comprising a QW header and a QW tail to a quantum payload comprising qubits.

In FIG. 3A, node 302 can include a QW generator 308 for generating a QW 310. A quantum payload generator, which includes a pump laser 312, a quantum source 314, a diachronic fiber coupler 316, and a time-bin encoder 318, can generate a quantum data payload 320 comprising a plurality of encoded qubits. In one embodiment, quantum source 314 can be a single photon source that includes a silicon carbide (SiC)-based photonic device and a metal-lens fiber interface. A time-tagger module 322 can provide precise timing control to QW generator 308 and pump laser 312 such that QW 310 and quantum data payload 320 can be combined by a 2×1 switch 324 to form a quantum datagram with quantum data payload 320 sandwiched by the header and tail included in QW 310. FIG. 3A also shows a switch controller 326 for controlling the operation of 2×1 switch 324. In one embodiment, 2×1 switch 324 can be a time-division-multiplexing (TDM) multiplexer and switch controller 326 provides selection signals to the multiplexer. Note that the timing of the selection signal outputted by switch controller 326 can be controlled by time-tagger module 322 and also be based on the QW header information. For example, switch controller 326 can control switch 324 to switch off the quantum data payload 320 and switch on the QW tail based on the length information associated with quantum data payload 320 included in the QW header.

FIG. 3B shows that 2×1 switch 324 outputs a QW datagram 328, which can be transmitted over optical fiber 306. As discussed previously, QW datagram 328 can include a QW header followed by the QW data payload and a QW tail. During transmission, the quantum states of the qubits in the quantum data payload are preserved, although the quantum state fidelity can be slightly degraded due to fiber loss.

FIG. 3C shows that once the QW datagram arrives at network node 304, a 1×2 switch 330 (which can be a TDM demultiplexer) separates the QW and the quantum data payload. The QW, including the header and the tail, can be received by a classical photo detector (PD) 332 and the quantum data payload can be received by a qubit or quantum detector 334 that can be a single photon detector (SPD) in the case of discrete-variable (DV) qubits or a homodyne detector in the case of a continuous-variable (CV) qubits. In one embodiment, quantum detector 334 can include a superconducting nanowire SPD (SNSPD) or a superconducting transition-edge sensor (TES), which can provide photon-number resolution capability. In another embodiment, quantum detector 334 can be a phase-sensitively amplified homodyne detector. The detection of the QW by classical photo detector 332 can trigger switch controller 336 to send appropriate selection signals to 1×2 switch 330.

Figure 3D:
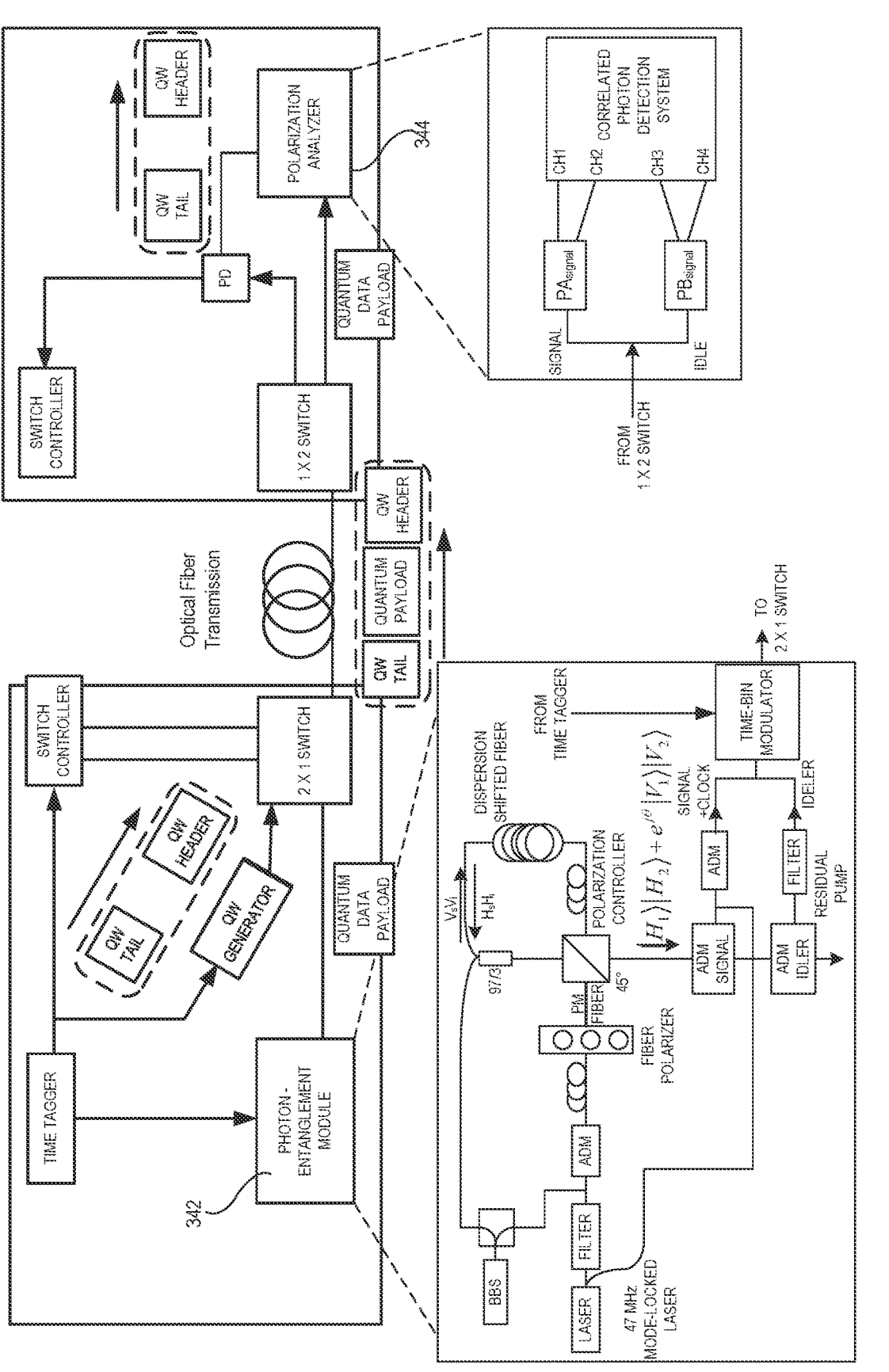
FIG. 3D illustrates transportation of quantum payloads with polarization-encoded qubits, according to one embodiment.

In addition to time-bin encoded qubits, the quantum data payload can also include polarization-encoded qubits. To maintain the quantum states of the qubits, the optical path taken by the quantum data payload (e.g., the optical fiber between the two nodes) should have very little polarization mode dispersion (PMD) and polarization dependent loss (PDL). Such conditions can be easily met by optical fibers used in today's optical transport network. Other than using a different qubit generation and detection mechanism, the system shown in FIGS. 3A-3C can be similarly used to transport QW datagrams with a data payload comprising polarization-encoded qubits by replacing single photon sources and detectors with polarization-entangled sources and detectors. FIG. 3D illustrates transportation of quantum payloads with polarization-encoded qubits, according to one embodiment. The network nodes in FIG. 3D can be very similar to network nodes 302 and 304 shown in FIGS. 3A-3C, except that the qubit or single photon source and the qubit or single-photon detector in FIGS. 3A-3C are now replaced with a polarization beam splitter-enabled photon-entanglement module 342 and a polarization analyzer 344. FIG. 3D also shows the exemplary implementations of photon-entanglement module 342 and polarization analyzer 344.

OWN Control and Management

Like any other type of network, QW networks require a management plane that governs network devices and their state (e.g., power, configuration, operational readiness, reliability functions, etc.) and a control plane that governs the data flows including signaling and routing for end-to-end transport. In recent years, the transparent optical telecommunication networking paradigm (central control and management overlaid on transparent data plane) and the 'hardware-defined' data communication networking paradigm (distributed control and management based on control bits in the hardware protocols) are converging toward the SDN paradigm, which offers centralized, software-defined, and programmable control and management planes separately from the data plane. In some embodiments of the instant application, the QWN protocol can be compatible with the SDN control plane and management plane.

More specifically, in some embodiments, an additional out-of-band DCC can provide communications among the network nodes (e.g., switches and routers) to form a Data Communication Network (DCN) for a centralized Network Control and Management (NC&M) while the QW offers in-band signaling for the quantum datagrams with an opportunity for distributed control planes at each network node. The in-band signaling dictates the rapid and local responses including forwarding of the quantum datagrams based on the forwarding table and the QW content. The DCN allows communications among the network elements, updates the forwarding table, and allows programming of programmable network elements based on the network traffic conditions. The additional out-of-band DCC also interoperates with the NC&M system to achieve QW distribution and to update the forwarding table of routers and switches at the edge and core of the network.

Figure 4:
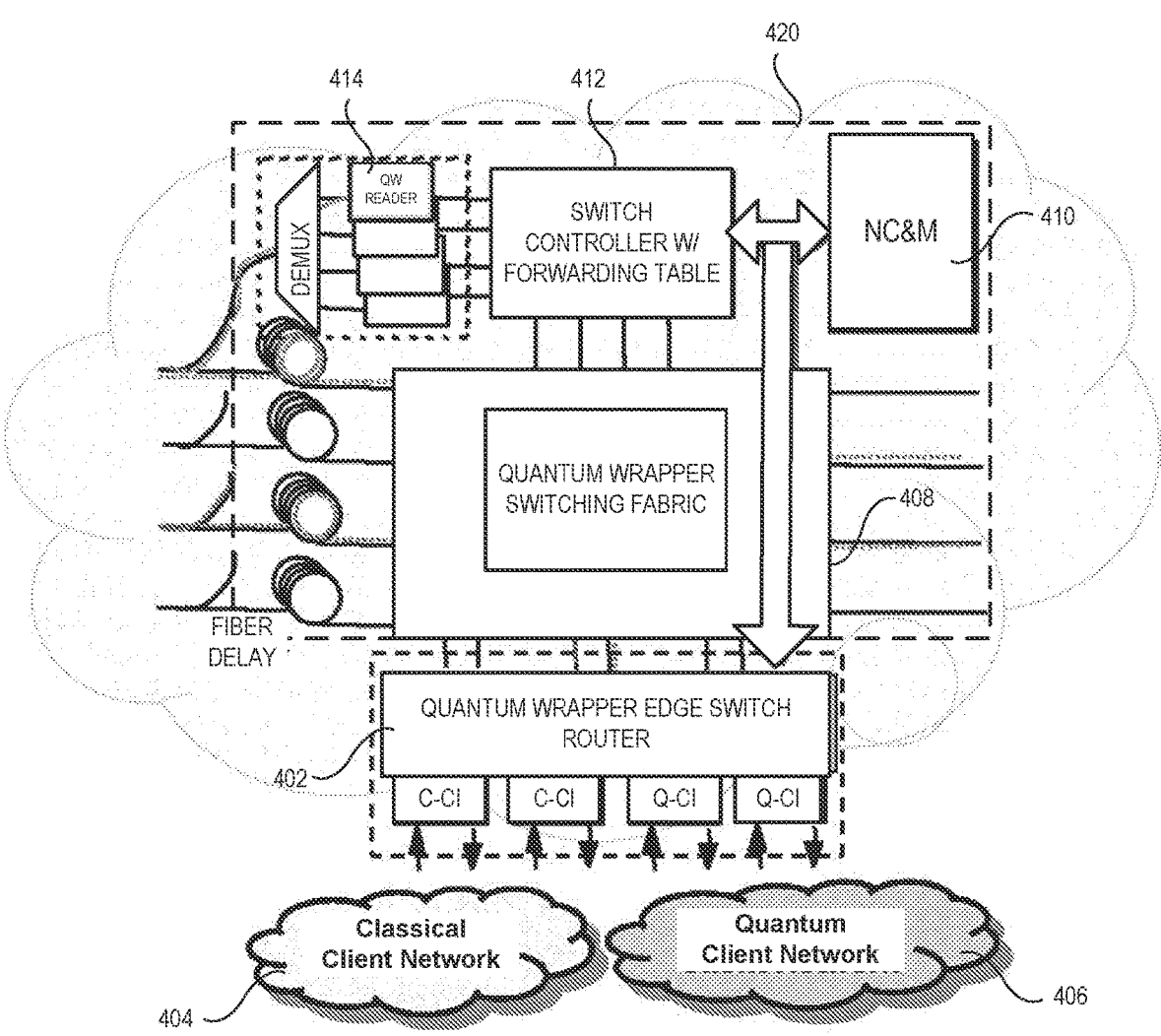
FIG. 4 illustrates the interaction between the QW core and edge switch routers with the network control and management (NC&M) system, according to one embodiment.

FIG. 4 illustrates the interaction between the QW core and edge switch routers with the network control and management (NC&M) system, according to one embodiment. In FIG. 4, a QW edge switch router 402 residing at the edge of the QW network can interface with one or more classical client networks (e.g., classical client network 404) via one or more classical client interfaces (C-CIs). In addition, QW edge switch router 402 can interface with one or more quantum client networks (e.g., quantum client network 406) via one or more quantum client interfaces (Q-CIs). By maintaining different types of client interfaces on QW edge switch router 402, quantum client networks can co-exist with classical client networks on the same network while the traffic will not intermingle at the receivers. For example, a quantum client network can ingress its quantum data payloads with appropriate signaling through the Q-CIs so that corresponding QW will be formed to wrap the quantum data payloads to ingress the quantum datagram with the QW to switch into the network. Similarly, a classical client network can ingress its classical data payloads with appropriate signaling through the C-CIs so that a corresponding QW will be formed to wrap the classical data payloads. Regardless of the type of the data payload (quantum or classical), the switching in the network can be done in a similar way.

QW edge switch router 402 is attached to a QW core switch router 420 that includes a QW switching fabric 408, an NC&M system 410, and a switch controller 412 that maintains a forwarding look-up table. More specifically, NC&M system 410 can update the forwarding table maintained by switch controller 412. The communication between NC&M system 410 and switch controller 412 can be carried using the out-of-band DCC.

FIG. 4 also shows that QW core switch router 420 includes a number of QW readers (e.g., QW reader 414) that read only the QW (including the header and tail) while bypassing the quantum data payload. Based on information included in the QW header and the forwarding table, switch controller 412 can control the switching operations in QW switching fabric 408. For example, based on a Class A QW, switch controller 412 can set up and tear down a circuit. Quantum datagrams can be directed to classical client network 404 via a C-CI or quantum client network 406 via a Q-CI.

OW Swapping

Figure 5A:
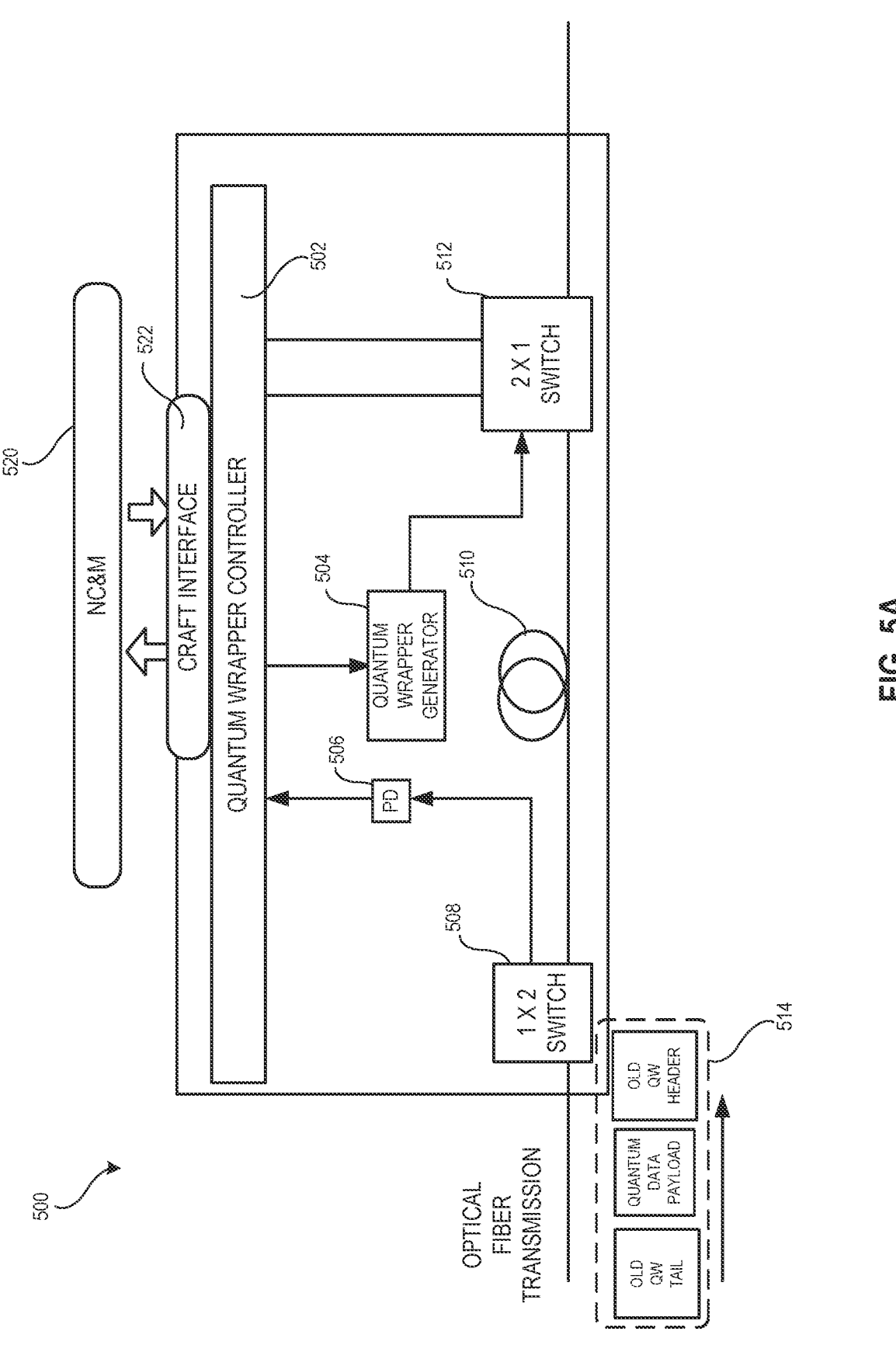
FIGS. 5A-5D illustrate an exemplary scenario for QW swapping, according to one embodiment.

Like optical labels in an OLS network, QWs in a QW network can be swapped (or updated) at a switch router. FIGS. 5A-5D illustrate an exemplary scenario for QW swapping, according to one embodiment. FIG. 5A shows a QW router 500, which can include a QW controller 502, a QW generator 504, a classical PD 506, an ingress switch 508, a fiber delay line 510, an egress switch 512, and an NC&M system 520. Other functional blocks on QW router 500 that do not pertain to the QW swapping operations are not shown in the drawing. FIG. 5A also shows that QW controller 502 interacts with the NC&M system 520. As discussed previously, QW controller 502 maintains a forwarding table, and NC&M system 520 can update the forwarding table based on conditions of the network. More specifically, NC&M system 520 can interface with QW controller 502 via a craft interface 522.

In FIG. 5A, a quantum datagram 514, which includes a QW header (referred to as old QW header), a data payload comprising qubits, and a QW tail (referred to as old QW tail), arrives at ingress switch 508 of QW router 500. Ingress switch 508 can be a 1×2 switch. In one embodiment, ingress switch 508 can be a TDM demultiplexer.

Figure 5B:
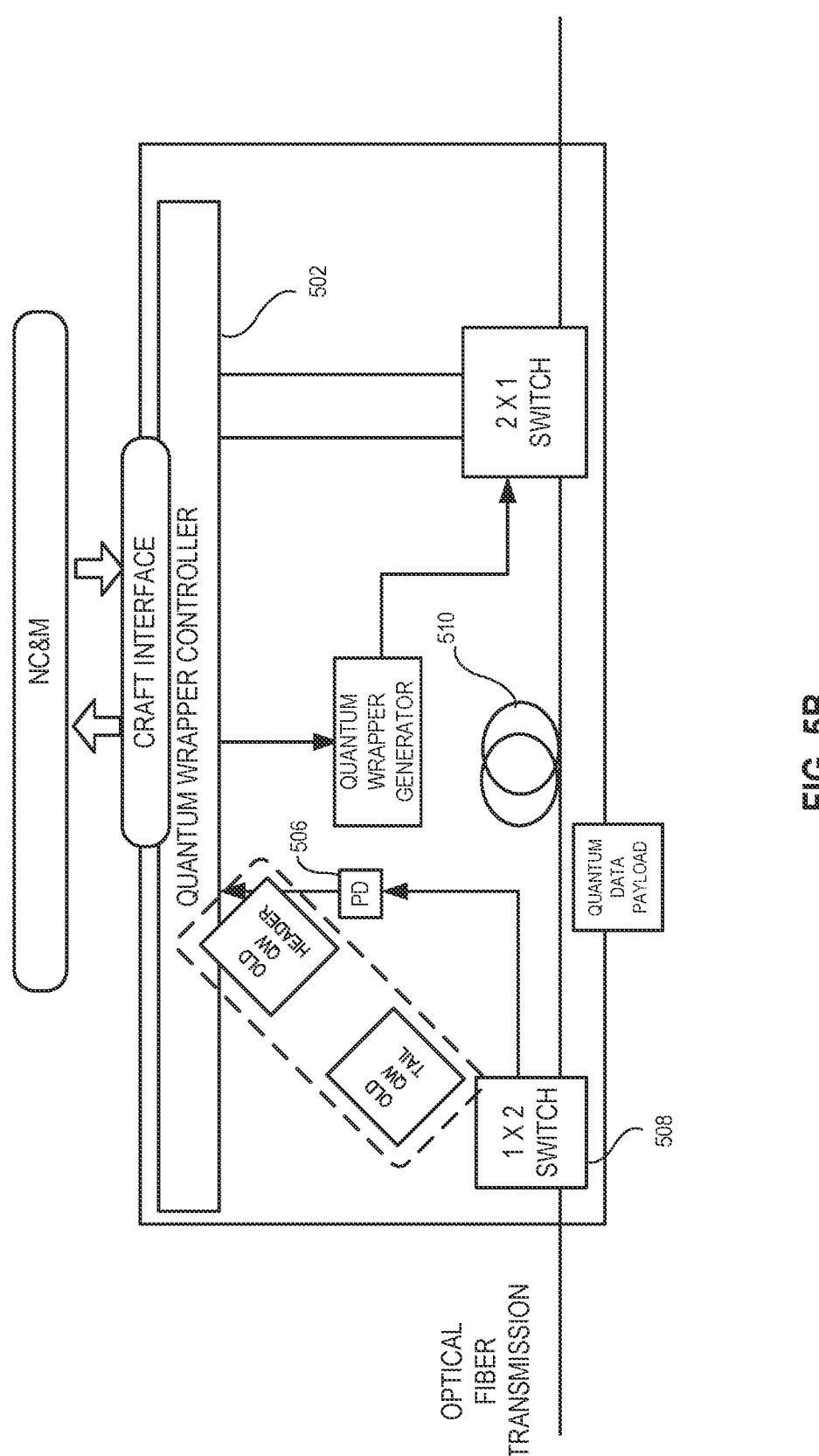

FIG. 5B shows that ingress switch 508 separates, in the time domain, the QW (including both the old QW header and the old QW tail) from the quantum data payload. FIG. 5B also shows that the old QW header and old QW tail are sent to classical PD 506 for detection, whereas the quantum data payload is sent to fiber delay line 510. Note that operations (especially the timing) of ingress switch 508 can be controlled by QW controller 502. The classical bits in the old QW detected by classical PD 506 are sent to QW controller 502, which can make a forwarding decision based on the old QW header and the forwarding table.

Figure 5C:
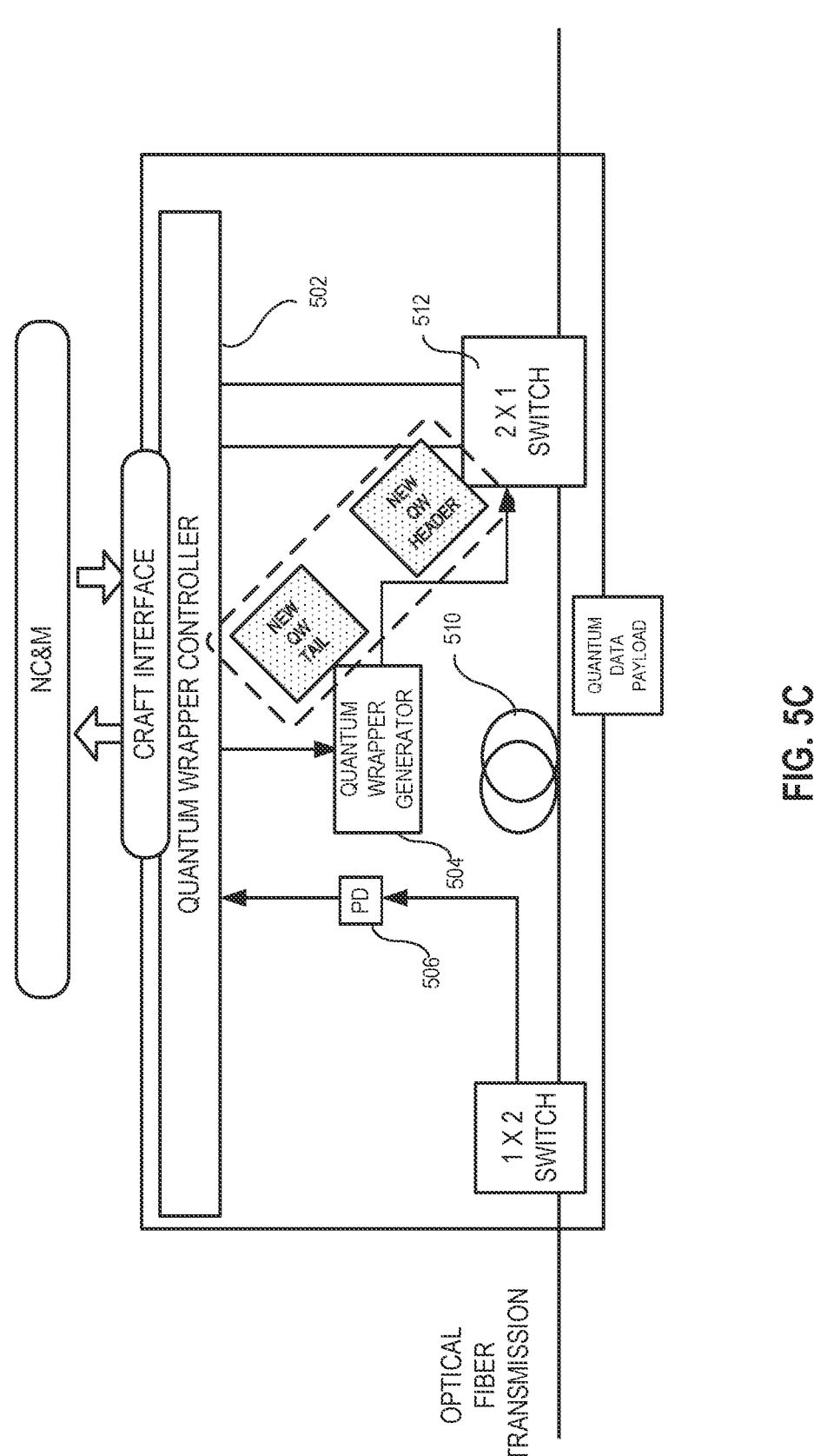
Figure 5D:
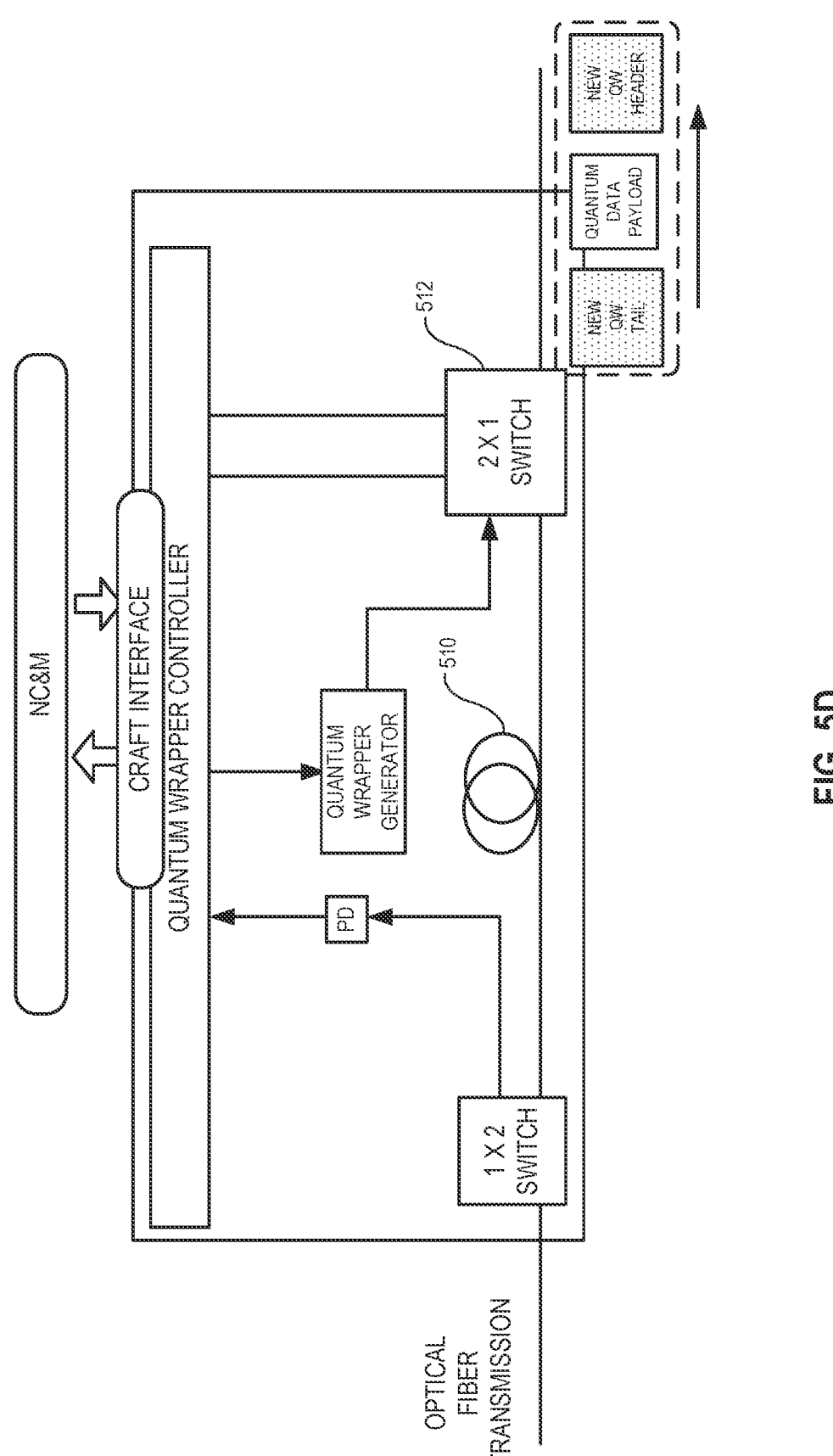

FIG. 5C shows that QW controller 502 sends a control signal to QW generator 504, instructing QW generator 504 to generate a new QW, including a new QW header and a new QW tail. While the old QW is being processed (e.g., being read) and the new QW being generated, the quantum data payload propagates on fiber delay line 510. The length of fiber delay line 510 can be controlled such that the time needed for processing the old QW, looking up the forwarding table, and generating the new QW substantially matches the time needed for the quantum data payload to propagate through fiber delay line 510. More specifically, the length of fiber delay line 510 is controlled such that, when the new QW and the quantum data payload arrive at egress switch 512, the quantum data payload can be inserted between the new QW header and the new QW tail. FIG. 5D shows that egress switch 512 combines the QW and the quantum data payload to obtain a quantum datagram with new QW.

The QW swapper shown in FIGS. 5A-5D can update and replace the existing QW header and tail of a quantum datagram with a new QW header and tail, similar to the label swapping in MPLS or OLS networks. Like the switch fabric in the MPLS or OLS, the QW switch fabric can also include the QW swappers or QW-swapping module.

Figure 6:
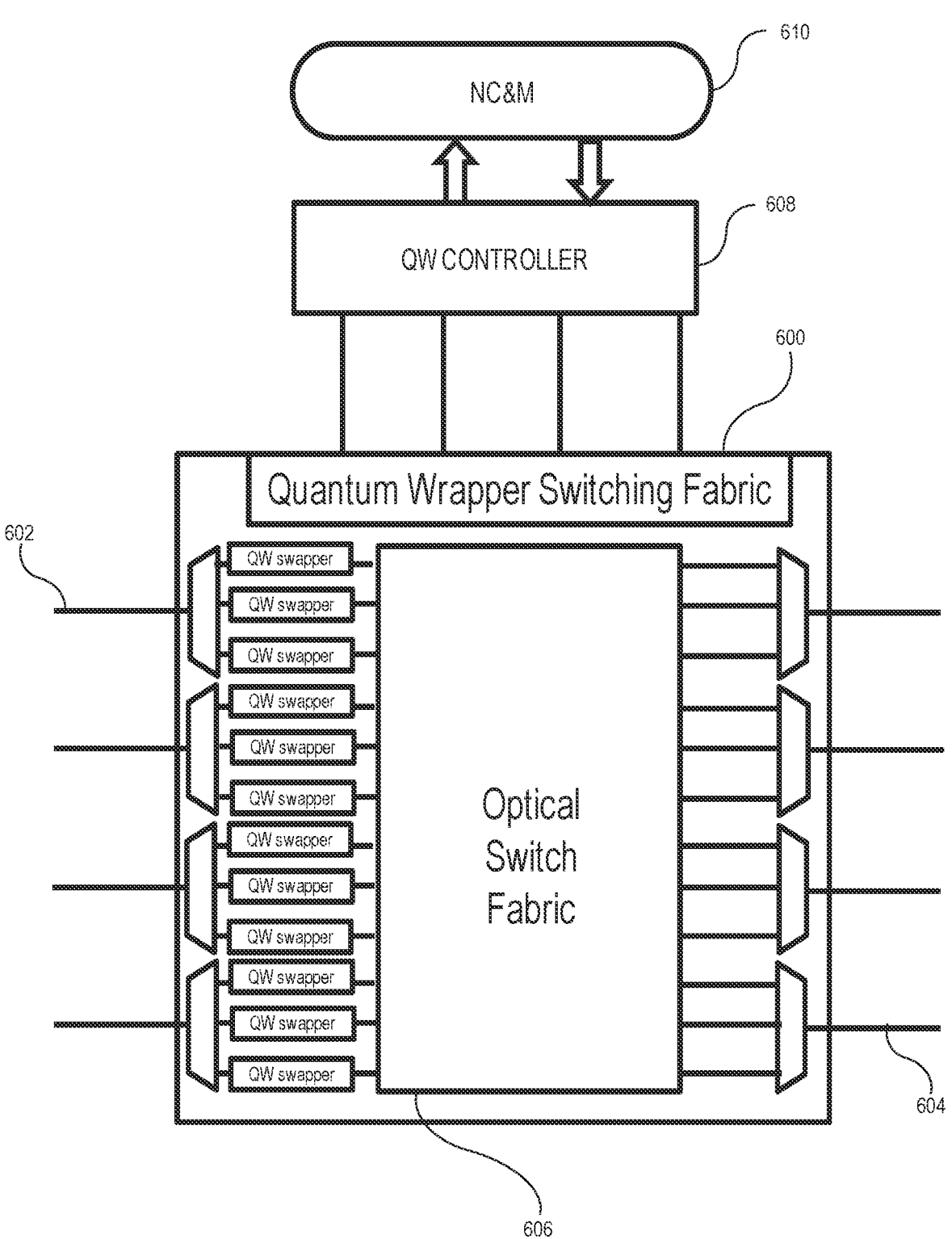
FIG. 6 illustrates an exemplary schematic of a QW switching fabric, according to one embodiment.

FIG. 6 illustrates an exemplary schematic of a QW switching fabric, according to one embodiment. FIG. 6 shows a QW switching fabric 600 comprising a plurality of input ports (e.g., input port 602), a plurality of output ports (e.g., output port 604), and an optical switch fabric 606. Each input/output port can also include a plurality of lanes, with each lane including a QW swapper for performing the QW swapping operation as shown in FIGS. 5A-5D. In the example shown in FIG. 6, the QW swapping occurs at the input ports. In practice, the QW swapping can also occur at the output ports or both. Optical switch fabric 606 can be similar to the switch fabric in OLS networks. FIG. 6 also shows QW controller 608, which controls the QW swapping operation and switching in QW switching fabric 600. QW controller 608 maintains the forwarding look-up table that can be updated by NC&M module 610. More specifically, QW controller 608 can interface with NC&M module 610 via a craft interface.

Performance Monitoring

Like any other type of network, there needs to be a way to monitor the performance of a quantum network. In fact, given that quantum components are delicate and probabilistic, and less well-developed than traditional technologies, performance monitoring of the quantum network is critical. However, true performance monitoring of the quantum data payloads is fundamentally infeasible due to the quantum nature of the qubits. On the other hand, because the QWs only consist of classical bits that can be measured, it is possible to estimate the quality of signal of the QWs. In the point-to-point examples shown in FIGS. 3A-3C, the QWs are created at the ingress to the network and are used to wrap the quantum data payloads. The QWs and the quantum data payload egress together at the destination. In other words, the QWs and the quantum data payload go through the same end-to-end path (same fibers, same switches, etc.). Consequently, there is a correlation between the impairments on the QWs and the quantum data payload.

In some embodiments, performance monitoring of a QW network can be achieved by monitoring the health of the QWs. Because the QWs are read at each node of the network, it is possible to perform measurements on the QWs at each node. For example, at each node of the network, measurements such as bit-error-rate (BER) testing, optical signal-to-noise ratio (OSNR), optical spectrum measurement, and/or checksum testing can be performed on the QWs. The measurement result can be a statistical indicator of the health of the quantum data payload, even though no measurement is performed on the quantum data payload. In other words, the statistical performance of the quantum data payload can be inferred from the performance of the QWs. In one embodiment, a performance-mapping table can be maintained to map the performance-monitoring data (e.g., BER, loss, time jitter, etc.) obtained from the QWs to inferred performance of the quantum data payload. For example, the measured BER of the QWs can be mapped to the inferred statistical BER of the quantum data payload. In further embodiments, coherent detection can be used to measure the classical bits in the QWs to obtain additional information, such as polarization dependent loss (PDL), polarization mode dispersion (PMD), and optical phase stability.

In addition to being read, the QWs may also be regenerated. For example, at certain nodes in the network, old QWs can be replaced by new QWs, as shown in FIGS. 5A-5D. However, as the QWs are being regenerated, the quantum data payloads propagate through the delay fibers, with no regeneration. Hence, in the multi-hop situation, using the performance monitoring data of the QW to infer the health of the quantum data payload should take into consideration the number of regenerations (or swaps) occurring on the QWs. Note that QW swapping does not necessarily happen at every node. In one embodiment, the performance-mapping table can include a column corresponding to the number of QW swaps associated with a quantum datagram.

Being able to monitor the performance of the network is essential. Not only can it provide information regarding the health of the quantum data payload being transported such that a corrupted data payload can be discarded timely, it can also provide information to the NC&M system that can be useful for the NC&M system to update the forwarding table. For example, if the inferred performance monitoring result indicate that certain links in the network have large PDL or PMD, which can be detrimental to polarization-encoded qubits, the NC&M system can then update the forwarding table to ensure that such links can be avoided when the quantum datagrams are forwarded in the network. Similarly, other factors that may affect the transportation of the quantum data payload, such as loss, time jitter, etc., can also be extracted from the measurement of the QWs, and the NC&M system can take them into consideration when updating the forwarding table.

Figure 7:
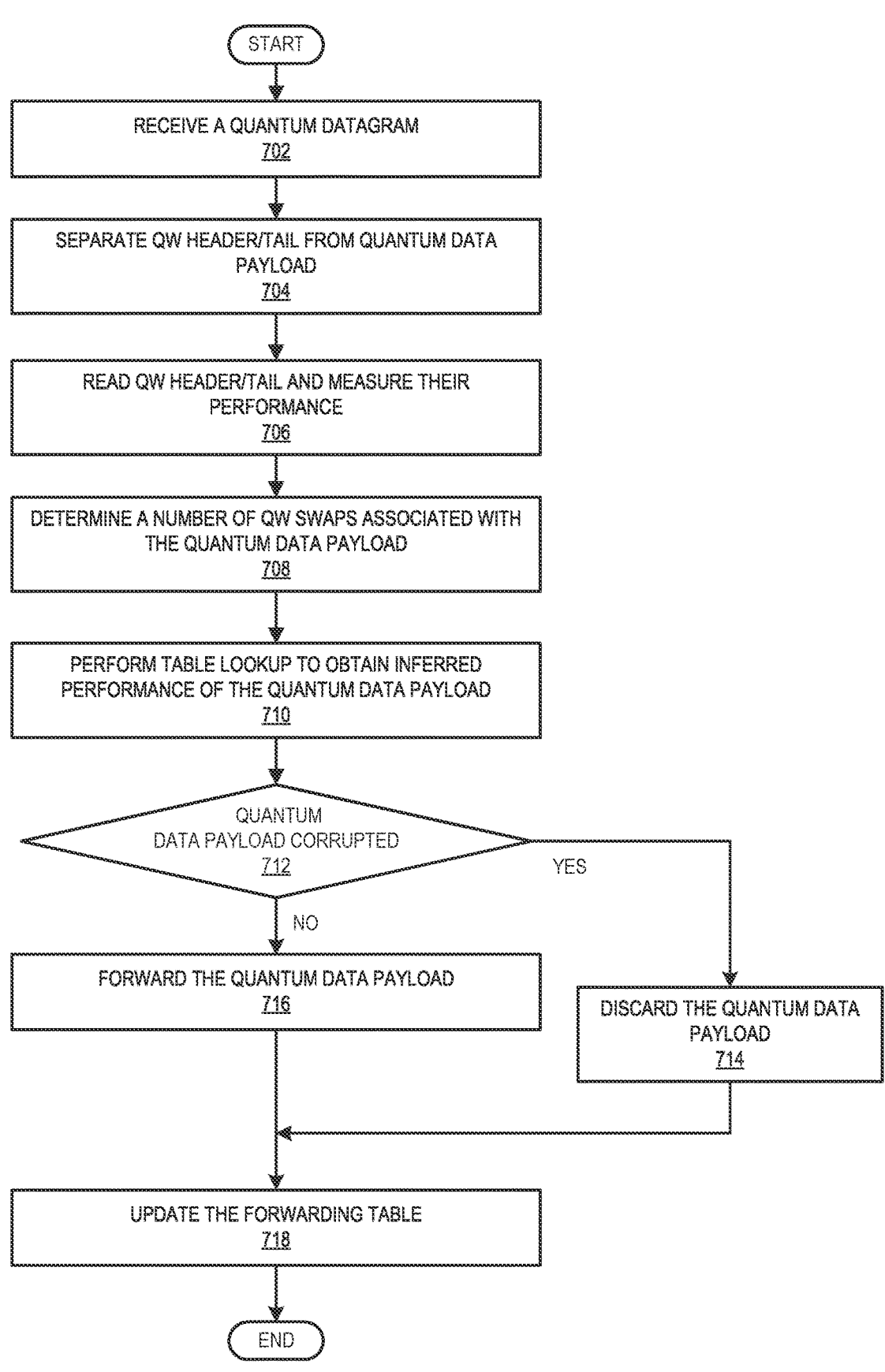
FIG. 7 presents a flowchart illustrating an exemplary process for forwarding a quantum datagram, according to one embodiment.

FIG. 7 presents a flowchart illustrating an exemplary process for forwarding a quantum datagram, according to one embodiment. During operation, a network node (e.g., a core switch router) receives a quantum datagram (operation 702). The quantum datagram can include three portions that are sequentially in time. The first portion is a QW header comprising classical bits of a predetermined format and data rate, the second portion is a quantum data payload comprising qubits of arbitrary format and data rate, and the third portion is a QW tail comprising classical bits of the predetermined format and data rate. There can be a sufficient guard time between adjacent portions.

The quantum datagram can be sent to a demultiplexer such that the QW header and tail can be separated from the quantum data payload (operation 704). The QW header and tail can be read and their performance measured while the quantum data payload is not disturbed (operation 706). As discussed previously, the QW header can include information pertaining to the quantum data payload, such as length, type, QoS, ToS, quantum data format, entanglement information, etc. Also note that the entanglement information can indicate the entanglement between the quantum data payload in the current quantum datagram and the quantum data payload in other quantum datagrams. Measurements of the performance of the QW header and tail include but are not limited to: BER measurement, OSNR measurement, optical spectrum measurement, checksum testing, dispersion measurement, PDL measurement, PMD measurement, jitter measurement, etc.

The NC&M system in the network can determine, for the same quantum data payload, the number of times the QW has been swapped (operation 708). For example, each time the QW header is swapped, a field in the QW header can increment by one. A table look-up can be performed based on the measured performance of the QW and the number of QW swaps to obtain the inferred performance of the quantum data payload (operation 710). The NC&M system can determine whether the quantum data payload is corrupted based on its inferred performance (operation 712). If so, the quantum data payload is discarded (operation 714). If not, the quantum datagram is forwarded to a particular output port based on content in the QW header and the forwarding table maintained by the switch controller (operation 716). Forwarding the quantum datagram may involve the switch controller making a forwarding decision based on the forwarding table and the switching fabric forwarding the quantum datagram to the particular output port. In certain scenarios, forwarding the quantum datagram can also involve replacing the current QW header/tail with a new QW header/tail. In addition, the NC&M system can update the forwarding table based on the inferred performance of the quantum data payload (operation 718).

In the example shown in FIG. 7, we assume that only the QWs are regenerated (e.g., through swapping), whereas the quantum data payload is not regenerated (e.g., amplified). The inability to amplify qubits has greatly limited the transmission distance of quantum datagrams. New technologies, such as quantum repeaters, are being developed to enable long distance transmission of the qubits. For example, entanglement swapping that slows the creation of entanglement over distances at which direct transmission is infeasible has been suggested as a principle for building quantum repeaters. In some embodiments, the QW swapper can incorporate the quantum repeater such that the quantum data payload can be regenerated when the QW is being swapped.

Figure 8:
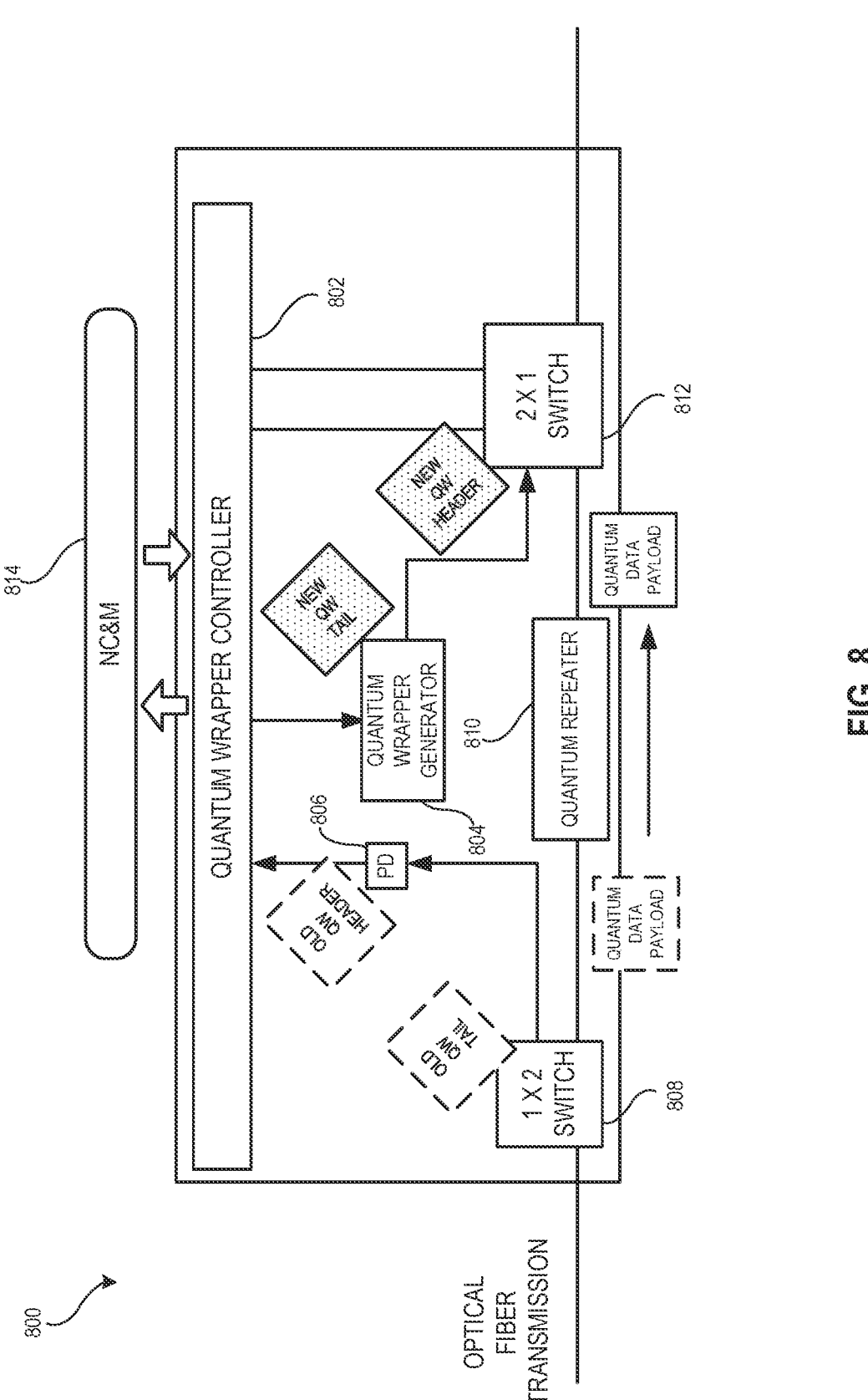
FIG. 8 illustrates an exemplary scenario for QW swapping with quantum repeater, according to one embodiment.

FIG. 8 illustrates an exemplary scenario for QW swapping with quantum repeater, according to one embodiment. In FIG. 8, a QW router 800 can include a QW controller 802, a QW generator 804, a classical PD 806, an ingress switch 808, a quantum repeater 810, an egress switch 812, and an NC&M module 814.

The various components (except for quantum repeater 810) in QW router 800 are similar to the components shown in FIGS. 5A-5D. Like the example shown in FIGS. 5A-5D, ingress switch 808 can separate the QW header/tail (labeled as old QW header/tail in FIG. 8) from the quantum data payload. Classical PD 806 reads the classical bits included in the QW header/tail and QW controller 802 controls QW generator 804 to generate new QW header and tail for the quantum data payload. At the same time, the quantum data payload is sent to quantum repeater 810 for regeneration. The regenerated quantum data payload and the new QW header/tail can be combined by egress switch 812. The precise timing for combining the new QW header/tail with the quantum data payload can be controlled by a QW controller 802. For example, QW controller 802 can send out a control signal to egress switch 812 to turn on/off the two signal paths at appropriate times. QW controller 802 interfaces with NC&M system 814 via a craft interface. In addition to a quantum repeater, other devices (e.g., a quantum memory) that can enhance the signal quality of the quantum data payload can also be used here.

Exemplary Computer and Communication System

Figure 9:
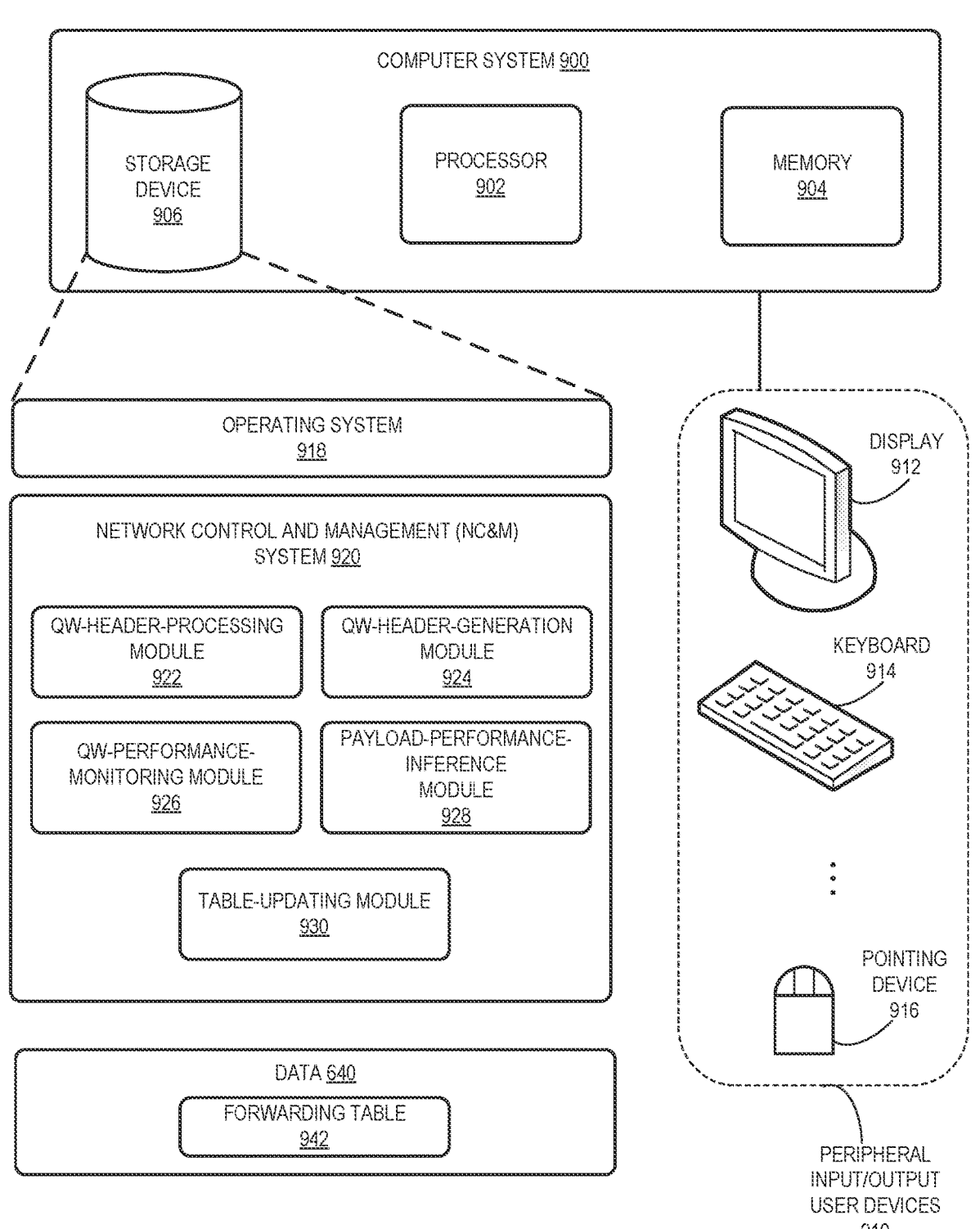
FIG. 9 illustrates an exemplary computer system, according to one embodiment.

FIG. 9 illustrates an exemplary computer system, according to one embodiment. Computer system 900 includes a processor 902, a memory 904, and a storage device 906. Furthermore, computer system 900 can be coupled to peripheral input/output (I/O) user devices 910, e.g., a display device 912, a keyboard 914, and a pointing device 916. Storage device 906 can store an operating system 918, an NC&M system 920, and data 940.

NC&M system 920 can include instructions, which when executed by computer system 900, can cause computer system 900 or processor 902 to perform methods and/or processes described in this disclosure. Specifically, NC&M system 920 can include instructions for processing QW headers (QW-header-processing module 922), instructions for generating new QW headers (QW-header-generation module 924), instructions for monitoring performance data of the QW (QW-performance-monitoring module 926), instructions for inferring the performance of the quantum data payload (payload-performance-inference module 928), and instructions for updating the forwarding table (table-updating module 930). Data 940 can include a forwarding table 942.

In general, the disclosed embodiments provide a quantum networking solution that can transport information encoded in quantum states (known as qubits) across a network. More specifically, a plurality of qubits forms a quantum data payload, and a quantum wrapper (QW) comprising classical bits wraps around the quantum data payload in the time domain (with a QW header leading the quantum data payload and a QW tail trailing the quantum payload) to form a quantum datagram. When the quantum datagram is transported in the network, only the QW is read at each node (e.g., a QW switch router), whereas the qubits in the quantum data payload are not disturbed in order to maintain the quantum states of the qubits. QW swapping can also occur at the network node where, after reading the old QW of an ingress quantum datagram, a new QW (including the header and the tail) can be generated and attached to the quantum data payload. The QW swapping module can also incorporate a quantum repeater that can regenerate the qubits in the quantum data payload while the QW is being processed and possibly swapped. After the QW is swapped and/or the quantum payload is regenerated, the quantum datagram can be forwarded by the switching fabric in the QW switch router based on content of the QW header and the forwarding table maintained by the controller of the switching fabric. Although direct monitoring of the health of the qubits cannot be achieved, indirect optical performance monitoring can be achieved by monitoring the classical bits in the QW and by inferring the performance of the quantum data payload based on the measured performance of the QW. The proposed QWN solution is fully compatible with the SDN control plane and management plane.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for transporting quantum datagrams over a network, the method comprising:

obtaining, at a network node, a quantum datagram comprising a wrapper and an optical quantum data payload, wherein the wrapper comprises a header with classical non-quantum optical bits and the quantum data payload comprises quantum bits (qubits), and wherein the quantum data payload is positioned, in time, after the header such that the network node receives or obtains the header prior to receiving or obtaining the quantum data payload;

separating the header of the wrapper from the quantum data payload and sending the classical non-quantum optical bits included in the header of the wrapper to a processor for processing;

after the classical non-quantum optical bits included in the header of the wrapper have been sent to the processor for processing, receiving the quantum data payload in an optical delay line and propagating the quantum data payload in the optical delay line such that the qubits included in the quantum data payload remain undisturbed by processing of the classical non-quantum optical bits included in the header of the wrapper; and making a forwarding decision for the quantum datagram based on the processed wrapper.

2. The method of claim 1, wherein the wrapper further comprises a tail, and wherein the quantum data payload is positioned, in time, between the header and the tail.

3. The method of claim 1, wherein the wrapper comprises one or more of:

an identifier of a circuit for circuit-switching of the quantum datagram;

a label for label-switching of the quantum datagram; and destination and source addresses for the quantum datagram.

4. The method of claim 1, wherein the wrapper indicates one or more of:

length of the quantum data payload;

priority of the quantum data payload;

quality of service (QoS) of the quantum data payload;

type of service (ToS) of the quantum data payload;

entanglement information associated with the quantum data payload and quantum data payloads of other quantum datagrams; and additional bits for error estimation.

5. The method of claim 1, wherein the qubits comprise one or more of:

time-bin encoded photons;

frequency-bin encoded photons; and polarization-encoded photons.

6. The method of claim 1, wherein separating the wrapper from the quantum data payload comprises sending the quantum data payload to a first switch, and wherein the method further comprises, subsequent to processing the wrapper, combining the wrapper with the quantum data payload using a second switch.

7. The method of claim 1, further comprising:
generating a new wrapper; and
attaching the new wrapper to the quantum data payload prior to forwarding the quantum datagram.

8. The method of claim 1, further comprising:
subsequent to separating the wrapper from the quantum data payload, sending the quantum data payload to a signal enhancing system for improving signal quality of the quantum data payload, wherein the signal enhancing system comprises one or more of: a quantum repeater and a quantum memory.

9. The method of claim 1, further comprising:
monitoring signal quality of the wrapper;
statistically estimating signal quality of the quantum data payload based on the signal quality of the wrapper; and
applying corrective transformations to restore the signal quality of the quantum data payload without measuring the qubits.

10. The method of claim 9, wherein monitoring the signal quality of the wrapper comprises one or more of:
performing a bit-error-rate (BER) measurement;
performing an optical signal-to-noise ratio (OSNR) measurement;
performing an optical spectrum measurement;
performing a polarization dependent loss (PDL) measurement;
performing a polarization mode dispersion (PMD) measurement; performing a time jitter measurement; and
performing a checksum test.

11. The method of claim 1, further comprising implementing a software defined networking (SDN) protocol to achieve network control and management.

12. The method of claim 1, wherein the network co-exists with one or more classical networks comprising:
an Ethernet network;
a multiprotocol label switching (MPLS) network;
an optical transport network (OTN);
an asynchronous transfer mode (ATM) network; and
an Internet protocol (IP) network.

13. A system for transporting quantum datagrams over a network, the system comprising:
an ingress switch to separate a wrapper from an optical quantum data payload included in a received quantum datagram, wherein the wrapper comprises a header with classical non-quantum optical bits and the quantum data payload comprises quantum bits (qubits), wherein the quantum data payload is positioned, in time, after the header such that the ingress switch receives the header prior to receiving the quantum data payload;
a wrapper-processor to process the classical non-quantum optical bits included in at least the header of the wrapper, wherein the ingress switch is configured to send the classical non-quantum optical bits included in the header of the wrapper to the wrapper-processor after separating the wrapper from the optical quantum data payload;
an optical delay line to, after the classical non-quantum optical bits included in the header of the wrapper have been sent to the wrapper-processor for processing, receive the quantum data payload and propagate the quantum data payload while the classical non-quantum optical bits included in the wrapper are processed; and
a controller to make a forwarding decision for the quantum datagram based on the processed wrapper.

14. The system of claim 13, wherein the wrapper further comprises a tail, and wherein the quantum data payload is positioned, in time, between the header and the tail.

15. The system of claim 13, wherein the wrapper comprises one or more of:
an identifier of a circuit for circuit-switching of the quantum datagram;
a label for label-switching of the quantum datagram; and
destination and source addresses for the quantum datagram.

16. The system of claim 13, wherein the wrapper indicates one or more of:
length of the quantum data payload;
priority of the quantum data payload;
quality of service (QoS) of the quantum data payload;
type of service (ToS) of the quantum data payload;
entanglement information associated with the quantum data payload and
quantum data payloads of other quantum datagrams; and
additional bits for error estimation.

17. The system of claim 13, wherein the qubits comprise:
time-bin encoded photons;
frequency-bin encoded photons; and
polarization-encoded photons.

18. The system of claim 13, further comprising an egress switch to combine the wrapper with the quantum data payload subsequent to the wrapper being processed.

19. The system of claim 13, further comprising a wrapper-swapping module configured to:
generate a new wrapper; and
attach the new wrapper to the quantum data payload prior to forwarding the quantum datagram.

20. The system of claim 13, further comprising a signal enhancing system to improve signal quality of the quantum data payload, wherein the signal enhancing system comprises one or more of: a quantum repeater and a quantum memory.

21. The system of claim 13, further comprising a performance-monitoring module configured to:
monitor signal quality of the wrapper;
statistically estimate signal quality of the quantum data payload based on the signal quality of the wrapper; and
apply corrective transformations to restore the signal quality of the quantum data payload without measuring the qubits.

22. The system of claim 21, wherein monitoring the signal quality of the wrapper comprises one or more of:
performing a bit-error-rate (BER) measurement;
performing an optical signal-to-noise ratio (OSNR) measurement;
performing an optical spectrum measurement;
performing a polarization dependent loss (PDL) measurement;
performing a polarization mode dispersion (PMD) measurement; performing a time jitter measurement; and
performing a checksum test.

23. The system of claim 13, further comprising a software defined networking (SDN) module for achieving network control and management.

24. The system of claim 13, wherein the network co-exists with one or more classical networks comprising:
an Ethernet network;
a multiprotocol label switching (MPLS) network;
an optical transport network (OTN);
an asynchronous transfer mode (ATM) network; and
an Internet protocol (IP) network.

25. A quantum network, comprising:

a plurality of network nodes, wherein a respective node comprises:

an ingress switch to separate a wrapper from an optical quantum data payload included in a received quantum datagram, wherein the wrapper comprises a header with classical non-quantum optical bits and the quantum data payload comprises quantum bits (qubits), wherein the quantum data payload is positioned, in time, after the header such that the ingress switch receives the header prior to receiving the quantum data payload;

a wrapper-processor to process the classical non-quantum optical bits included in at least the header of the wrapper, wherein the ingress switch is configured to send the classical non-quantum optical bits included in the header of the wrapper to the wrapper-processor after separating the wrapper from the optical quantum data payload;

an optical delay line to, after the classical non-quantum optical bits included in the header of the wrapper have been sent to the wrapper-processor for processing, receive the quantum data payload and propagate the quantum data payload while the classical non-quantum optical bits included in the wrapper are processed; and a controller to make a forwarding decision for the quantum datagram based on the processed wrapper.

26. A method for transporting quantum datagrams over a network, the method comprising:

obtaining, at a network node, a quantum datagram comprising a wrapper and an optical quantum data payload, wherein the wrapper comprises classical non-quantum optical bits and the quantum data payload comprises quantum bits (qubits);

separating the wrapper from the quantum data payload such that the classical bits included in the wrapper are processed while the qubits included in the quantum data payload remain undisturbed;

making a forwarding decision for the quantum datagram based on the processed wrapper;

monitoring signal quality of the wrapper;

statistically estimating signal quality of the quantum data payload based on the signal quality of the wrapper; and applying corrective transformations to restore the signal quality of the quantum data payload without measuring the qubits.

27. A system for transporting quantum datagrams over a network, the system comprising:

an ingress switch to separate a wrapper from an optical quantum data payload included in a received quantum datagram, wherein the wrapper comprises classical non-quantum optical bits and the quantum data payload comprises quantum bits (qubits);

a wrapper-processor to process the classical bits included in the wrapper;

an optical delay line to propagate the quantum data payload while the classical bits included in the wrapper are processed;

a controller to make a forwarding decision for the quantum datagram based on the processed wrapper; and a performance-monitoring module configured to:

monitor signal quality of the wrapper;

statistically estimate signal quality of the quantum data payload based on the signal quality of the wrapper; and apply corrective transformations to restore the signal quality of the quantum data payload without measuring the qubits.

* * * * *